United States Patent [19]

Kuninaga et al.

[11] Patent Number: 4,775,452
[45] Date of Patent: Oct. 4, 1988

[54] PROCESS FOR DISSOLUTION AND RECOVERY OF NOBLE METALS

[75] Inventors: Tadashi Kuninaga, Urayasu; Hiroshi Daidoji, Okayama; Nobutaka Goto, Kashiwa, all of Japan

[73] Assignee: Chlorine Engineers Corp. Ltd., Tokyo, Japan

[21] Appl. No.: 12,668

[22] PCT Filed: Apr. 24, 1986

[86] PCT No.: PCT/JP86/00203
§ 371 Date: Dec. 23, 1986
§ 102(e) Date: Dec. 23, 1986

[87] PCT Pub. No.: WO86/06418
PCT Pub. Date: Nov. 6, 1986

[30] Foreign Application Priority Data

Apr. 25, 1985 [JP] Japan ................................ 60-87395

[51] Int. Cl.$^4$ ............................................. C25F 5/00
[52] U.S. Cl. ..................................... 204/146; 204/111
[58] Field of Search ............................ 204/109–111, 204/146

[56] References Cited

U.S. PATENT DOCUMENTS

| 961,924 | 6/1910 | Wohlwill | 204/111 |
| 2,088,250 | 1/1935 | Truthe | 204/111 |
| 2,735,810 | 2/1956 | Gagliano | 204/146 |
| 3,673,061 | 6/1972 | Kruesi | 204/111 |
| 3,787,293 | 1/1974 | Kametani | 204/108 |
| 3,886,055 | 5/1975 | Baboian et al. | 204/146 |
| 3,956,086 | 5/1976 | Wilkinson et al. | 204/105 R |

FOREIGN PATENT DOCUMENTS 973483 9/1979 U.S.S.R. ................................ 423/49

Primary Examiner—R. L. Andrews
Attorney, Agent, or Firm—Kuhn and Muller

[57] ABSTRACT

Disclosed herein is a process for dissolving and recovering noble metals form used catalysts. Noble metal components are leached out from particles supporting or containing at least one noble metal or noble metal compound by subjecting particles them to electrolysis, with the electrolyte being an acid, in the anode compartment of an electrolytic cell which divided by a diaphragm into anode and cathode compartments, and the resulting solution containing noble metals is subjected to electrolysis in a fluidized bed electrolytic cell, thereby causing the noble metals to separate out on to the fluidizing cathode particles. The thus deposited noble metals are again leached out in an electrolytic cell.

22 Claims, 1 Drawing Sheet

PROCESS FOR DISSOLUTION AND RECOVERY OF NOBLE METALS

TECHNICAL FIELD

The present invention relates to a process for dissolving and recovering noble metals from used catalysts and the like by the fluidized or fixed bed electrolytic processes.

BACKGROUND

Noble metals such as the platinum group are in general use as catalysts for automotive exhaust gas purification and organic chemical reactions, and fuel cell electrodes. They are also constituents of electronic parts such as ICs. The recovery of noble metals from used materials is important due to their rarity and expense.

This has hitherto been by the dissolution process. In this process, the metals are dissolved with the carriers in hot concentrated sulfuric acid or an oxidizing acid such as aqua regia, and the metals are separated from the solution by addition of a reducing agent or by electrolyzing the solution in low current density electrolytic cell. In the former case, the noble metals separate out in the solution, which in the latter case, they are deposited on the cathode.

The dissolution process requires a dangerously high oxidizing acid that is difficult to handle, and a large amount of heat to maintain the acid temperature. Additionally, aqua regia, long been used for noble metals dissolution, gives off NOx producing pollution treatment problems. Cyanides, such as sodium cyanide, are effective for noble metals dissolution, but need careful handling and adequate liquid waste treatment due to their high toxicity.

In addition, the dissolution process is uneconomical in noble metals recovery from noble metal catalysts, because it involves the treatment of a large amount of carrier containing solutions as well as noble metals. (Noble metal catalysts are composed of carriers such as silica and alumina and very small amounts of noble metals therein. Therefore, the volume ratio of noble metal to catalyst is very small: 1 g of noble metal to 1 liter in apparent volume of catalyst.) Moreover, at times a portion of noble metal is present as oxides, barely soluble in aqua regia. In such cases, it is necessary to reduce the noble metal oxides before dissolution, or perform the dissolution process in two steps, i.e., noble metal dissolution in acid and noble metal oxide dissolution in alkali (see Japanese Patent Laid-open No. 155333/1982).

On the other hand, several processes are proposed for electrolysis metal dissolution (see Japanese Patent Laid-open No. 37045/1976); however, nothing has been reported on the use of electrolysis to dissolve noble metals supported on granular carriers. In the case of noble metals, the resulting solution would be too dilute to handle economically. The addition of a reducing agent increases the amount of solution to be treated and therefore the operating cost, beyond practical consideration. The use of ordinary flat electrodes in the electrolytic cell creates a dilute solution that does not permit efficient recovery.

DISCLOSURE OF THE INVENTION

The object of the present invention is to provide a process for recovering noble metals from crushed granules of used catalysts, fuel cell electrodes, and electronic parts. This process utilizes the advantages of the electrolytic process; therefore, it does not need an oxidizing acid and waste acid solution disposal. In this process, the noble metals are dissolved in the electrolyte of the anode compartment of an electrolytic cell; the resulting dilute solution is introduced into the cathode compartment of a fluidized bed electrolytic cell in which the noble metals deposit on the cathode particles.

The crushed granules may be in spherical, cylindrical, plate, or conical shapes, or shapeless which obtained by crushing, pulverizing or from ashes-left after-incineration. They are not restricted as the crushed granules.

As a practical example, the invention will be illustrated below in more detail with the recovery of noble metals from used catalysts.

It is uncertain how noble metals are leached from non-conductive catalyst carriers; but it is considered that the leaching is affected by many factors in combination, such as anodic dissolution caused by the flow of electric currents from the anode to the noble metals, dissolution when individual noble metal granules act as multiple electrodes, and chlorine actions from the electrolysis of components in the electrolyte.

The noble metals to which the process of this invention is applied are not specifically limited. They include palladium, platinum, rhodium, ruthenium, iridium, silver, and gold supported on catalyst carriers such as alumina, silica, and silica-alumina, and also used for fuel cell electrodes and electronic parts such as ICs. In the case of used catalysts, the amount of noble metal or noble metal compound is 0.1 to 50 g for 1 kg of carrier, depending on the catalyst application.

The electrolytic cell for noble metal dissolution is not specifically limited in structure or material so long as it is composed of anode and cathode compartments separated by a diaphragm. The diaphragm should prevent noble metals dissolved in the anode compartment from diffusing into the cathode compartment and depositing on the cathode. Therefore, it should preferably be an anion exchange membrane to prevent cation diffusion when the noble metal components are present in the form of cations in the electrolyte. However, a neutral or anion exchange membranes may also be used, depending on the electrolyte composition and the type of dissolved noble metal components since noble metal components are not always in the form of cations. In addition, the diaphragm should be properly positioned so that the anode compartment is larger than the cathode since in the process, dissolution takes place in the anode compartment.

The anode and cathode used in the electrolytic cell may be of any common type; for example, a dimensionally stable anode covered by a noble metal oxide and a titanium cathode. The two electrodes should be arranged for a minimum voltage required for electrolysis. The electrolytic cell can be run at low voltage if a perforated cathode is used to discharge the gas generated between the cathode and the membrane through the cathode.

The electrolytes for this invention can be hydrochloric, nitric, sulfuric, or mixed acids. Hydrochloric acid is preferred due to comparatively easy waste gas and liquid disposal. The hydrochloric acid concentration can range from 5 to 35%.

The electrolytic cell is run as follows. With the used catalyst crushed granules placed in the anode compartment, electrolysis is carried out while the anode compartment is being supplied with electrolyte. The granules may be fluidized or stationary.

The fluidization of granules may be accomplished by stirring a box-type electrolytic cell with a corrosion resistant propeller or by feeding electrolyte upward from the bottom of a cylindrical electrolytic cell. In the case of fluidized bed electrolysis, the particles rotate continuously, facilitating the noble metal or noble metal compound dissolution supported thereon. In the case of fixed bed electrolysis, the particles fill the anode compartment and are kept stationary. This method is suitable for irregular particles which cannot be uniformly fluidized. A disadvantage of this method is the necessity for large amounts of electrolyte to circulate for the complete dissolution of noble metals or compounds supported on the carrier.

According to this invention, noble metals recovery can be increased if electrolysis is suspended when half completed and the electrolyte containing dissolved noble metals is replaced by fresh electrolyte. After the completion of electrolysis, the electrolyte containing dissolved noble metals and residues is discharged from the electrolytic cell, filtered under pressure, and washed. This washed liquid may be recycled in the dissolution or precipitation step to increase noble metal recovery.

The noble metal solution thus obtained contains only a fraction of a gram of noble metals in each liter. Such a dilute solution cannot be used as such for catalyst preparation, plating or other applications. It should be concentrated or treated first for noble metal separation.

According to this invention, the dilute solution containing noble metals obtained as above is introduced into a fluidized bed electrolytic cell containing fluidized cathode particles on which the noble metals deposit. The noble metal carrying cathode particles should be again subjected to electrolysis for noble metal redissolution and concentration, if a solution of a certain concentration is necessary as in the case of catalyst preparation. The concentration of noble metals by electrolysis also contributes to their purification.

The fluidized bed electrolytic cell suitables for the process of this invention is disclosed in Japanese Patent Laid-open No. 200994/1985 and U.S. Pat. No. 4,569,729 filed by the present applicant.

Very important in this noble metal deposition in a fluidized bed electrolytic cell is that the electrolyte acid should be properly diluted if it has great conductivity. Otherwise, electrolysis does not take place on the particle surface and the noble metals deposit on the cathode as the current collector. Dilution is accomplished with the wash liquid used in the previous dissolution step.

According to the process of this invention, the noble metals in used catalysts are dissolved in electrolyte by electrolysis in the anode compartment of the electrolytic cell, without using cyanide or oxidizing acid needing careful handling. The resulting dilute solution containing noble metals may be treated for the separation of noble metals or may be concentrated for the purification of recovered noble metals.

BEST MODE FOR CARRYING OUT THE INVENTION

Examples of this invention are described as follows. They are not intended to limit the scope of the invention.

EXAMPLE 1

Figure 1:
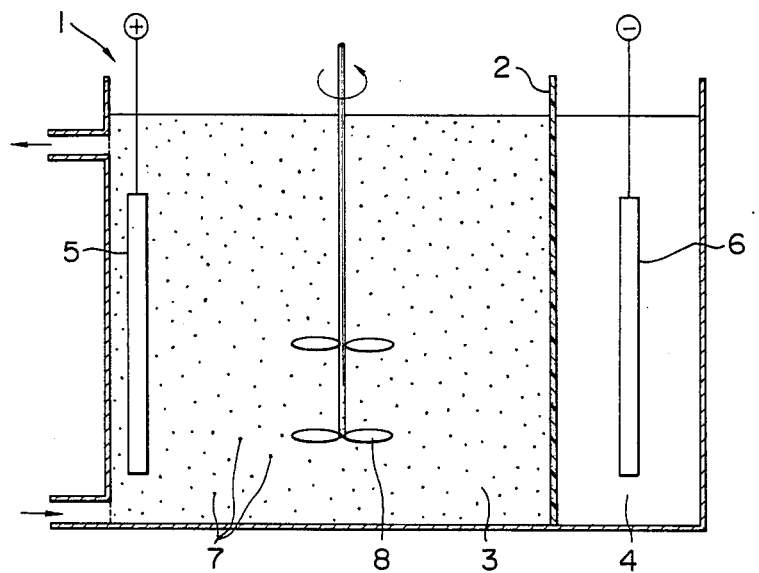
FIG. 1 is a schematic representation of the fluidized bed electrolytic cell used in this invention.

The recovery of platinum from an automotive exhaust gas purification catalyst was accomplished with a fluidized bed electrolytic cell as shown in FIG. 1. The catalyst with an apparent density of 0.65 kg/liter contained carrier alumina having 3 mm average particle diameter and supporting a very small amount of palladium. These also was about 1 g of platinum in 1 kg of the catalyst.

The electrolytic cell (1) was a box type, 85 mm long, 115 mm wide, and 200 mm deep. The cell (1) was divided into anode (3) and cathode (4) compartments by the fluoroplastic-based anion exchange membrane (2). The ratio of the anode to the cathode compartment was 17:6 by volume. The anode (5) was a porous dimensionally stable anode, and the cathode (6) was of titanium. With the cathode compartment (4) filled with 15 wt. % hydrochloric acid and the anode compartment (3) loaded with 0.8 kg of the catalyst particles (7), 3.5 liters of 15 wt. % hydrochloric acid was circulated through the anode compartment (3) at a rate of 2 liters/hr. With the catalyst particles (7) kept fluidized by the polytetrafluoroethylene propeller (8), electrolysis occurred at 5 A current for 4 hours. After two hours of electrolysis, the concentration of platinum was 147 mg/liter, and at completion, the concentrations of platinum and palladium were respectively 226 mg/liter and 17.1 mg/liter. Platinum recovery was 98.9% and the current efficiency was 2.2%.

COMPARATIVE EXAMPLE 1

The same procedure as in Example 1 was repeated except that no electric current was applied to the electrolytic cell. After 2 hours of circulation, the platinum concentration in the solution was 9.9 mg/liter, and after 4 hours it was 15.3 mg/liter and for palladium 0 mg/liter.

EXAMPLE 2

Figure 2:
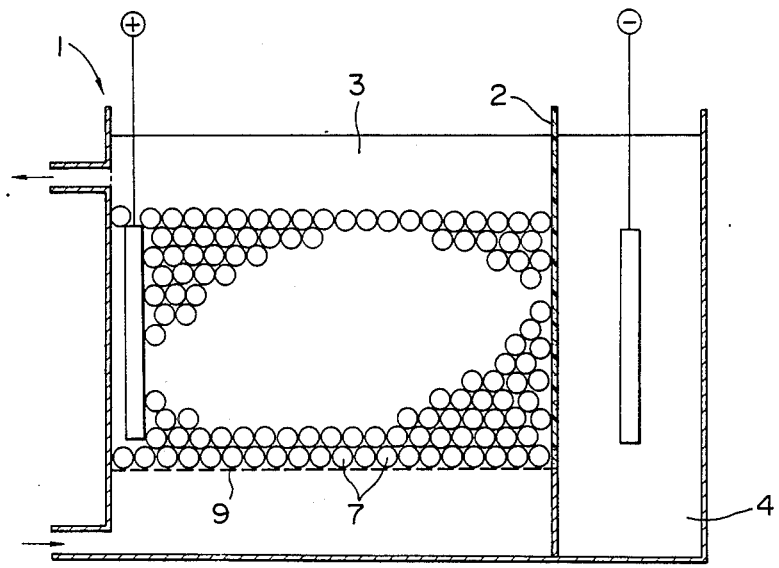
FIG. 2 is a schematic representation of the fixed bed electrolytic cell.

Palladium recovery from the catalyst for selective cracked gasoline hydrogenation used the fixed bed electrolytic cell shown in FIG. 2. The catalyst was composed of carrier alumina pellets having an 3.2 mm average particle diameter supporting palladium. The amount of palladium was about 30 g of palladium for each in kg of catalyst, and the apparent density of the catalyst was 0.6 kg/liter. Prior to electrolysis, the catalyst was treated to reduce oxide to metallic palladium.

The electrolytic cell (1) was the same as in Example 1 except that a difuser plate (9) supporting a 10-mesh net (1.65 mm opening) was fixed at the anode compartment (3) bottom. A kg of the catalyst was particles (7) placed on the diffuser plate (9), and the anode compartment filled with 15 wt. % hydrochloric acid. With the catalyst particles (7) kept stationary, electrolysis was carried out with a 5 A current for 4 hours. During electrolysis, 10 liters of 10 wt. % hydrochloric acid was circulated through the anode compartment (3) at a rate of 2 liters/hr. When electrolysis was complete, the concentration of palladium was 1465 mg/liter, with a 48.8% ratio of dissolution.

COMPARATIVE EXAMPLE 2

The same procedure as in Example 2 was repeated without electric current in the cell. After 4 hours circulation, the palladium concentration in the solution was 37 mg/liter.

EXAMPLE 3

The recovery of gold from gold-plated alumina IC substrates was carried out. IC substrates (32 g in total) were crushed into particles smaller than 1.2 mm diameter, and incinerated at 850° C. for 12 hours. Gold was leached from the particles by using the fluidized bed electrolytic cell show in FIG. 1. With the particles in the anode compartment fluidized by the propeller, electrolysis was performed with a 10 A current for 30 minutes while 5 liters of 10 wt. % hydrochloric acid circulated though the anode compartment. At 15 and 30 minutes of electrolysis, the gold concentration in electrolyte was respectively 151 and 187 mg/liter. And the current efficiency about 2.5%. No gold was detected in the particles after electrolysis.

COMPARATIVE EXAMPLE 3

The same procedure as Example 3 was without electric current in the cell. After 15 minutes circulation, no gold was detected in the electrolyte, and after 30 minutes a trace of gold was detected. Most gold remained undissolved on IC substrates.

EXAMPLE 4

Palladium and platinum recovery from a hydrogenation catalyst was carried out using the fluidized bed electrolytic cell shown in FIG. 1. The catalyst contained a carrier of carbon particles supporting palladium and platinum. Prior to electrolysis, the catalyst was burned and ashes smaller than 15 mm diameter were collected by screening. The ashes were found to be palladium, platinum, iron, aluminum, silicon, calcium, magnesium oxide, and unburned carbon. The amount of palladium oxide was about 25% and platinum oxide 2%.

The anode compartment was filled with 26 wt. % hydrochloric acid and 330 g catalyst ash (having an apparent volume of 550 ml). Keeping the catalyst ash fluidized by the propeller, electrolysis was carried out at 30 A current for 3 hours. During electrolysis, 26 wt. % hydrochloric acid was fed to the anode compartment at 2 liters/hr. At the beginning, palladium and platinum were not in the electrolyte. After 1.5 hours of electrolysis, the palladium and platinum concentrations in the electrolyte were respectively 8930 and 715 mg/liter. Upon electrolysis completion, they were respectively 12,750 and 980 mg/liter. 12 ppm palladium and 0 ppm platinum remained in the ash after electrolysis, indicating almost quantitative dissolution.

COMPARATIVE EXAMPLE 4

The same procedure as in Example 4 was repeated without an electric current. Before electrolyte circulation, both palladium and platinum were found in the electrolyte. After 1.5 hours of circulation, the concentrations of palladium and platinum were 9.2 and 0 mg/liter, and after 3 hours of circulation, they were 13.4 and 0 mg/liter. The palladium and platinum dissolution ratios were 0.2% and 0%.

EXAMPLE 5

Noble metal recovery from automotive exhaust gas purification catalysts was carried out using the fixed bed electrolytic cell shown in FIG. 2. The catalyst was a so-called ternary catalyst composed of platinum, palladium, and rhodium supported on an alumina carrier containing about 300 ppm platinum, about 1000 ppm palladium, and about 15 ppm of rhodium.

The electrolytic cell (1) was a box type measuring 180 mm long, 250 mm wide, and 1000 mm deep divided into anode and cathode compartments (3), (4) by the fluoroplastic-based anion exchange membrane (2). There was a 5:1 volume ratio of anode to cathode compartment. The anode (5) was porous and dimensionally stable and the cathode (6) was titanium. With the cathode compartment (4) filled with 30 wt. % hydrochloric acid and the anode (3) loaded with 22 kg of catalyst crushed into 20 to 40 mesh particles (7), electrolysis was performed with a 200 A current for 6 hours. During electrolysis, 45 liters of 30 wt. % hydrochloric acid circulated though the anode compartment (3) at a rate of 80 liters/hr. Upon electrolysis completion, the concentrations of platinum, palladium, and rhodium in the electrolyte were 118, 347, and 6 mg/liter, respectively. Upon analysis of the residue, it was found that 97% of the platinum, 96% of the palladium and 69% of the rhodium were leached out.

EXAMPLE 6

The same procedure as in Example 5 was repeated except that after 4 hours of electrolysis, the electrolyte in the anode compartment was replaced by 35 wt. % hydrochloric acid which electrolysis continued for 2 hours.

After the first 4 hours, 94% of the platinum, 94% of the palladium, and 59% of the rhodium had been leached out. After the second 2 hours, 97% of the platinum, 98% of the palladium, and 74% of the rhodium were leached out. It is noted that more palladium and rhodium were leached out than in Example 5.

EXAMPLE 7

The solution containing palladium and platinum obtained in Example 4 was diluted about 50 times, and the diluted solution electrolyzed with a 50 A current using a cylindrical fluidized bed electrolytic cell about 1000 mm high with an anode about 50 mm in diameter and a cathode of about 140 mm, separated from each other by a cation exchange membrane as the diaphragm. The cathode particles were carbon. During electrolysis, the electrolyte was circulated. The concentrations of palladium and platinum were reduced to 14 and 13 mg/liter, respectively.

EXAMPLE 8

The solution containing platinum, palladium, and rhodium obtained in Example 5 was diluted about 6 times, and the diluted was electrolyzed with a 20 A current by using a cylindrical fluidized bed electrolytic cell about 600 mm high, with an anode of about 30 mm in diameter and a cathode of about 90 mm in diameter, separated from each other by a cation exchange membrane. The cathode particles were carbon. During electrolysis, the electrolyte was circulated. The concentrations of platinum, palladium, and rhodium were reduced to 2, 3 mg/liter, and an undetectable level, respectively.

EXPLOITATION CAPABILITIES IN INDUSTRY

This invention enables noble metals or noble metal compounds supported on or contained in used catalysts to be dissolved in electrolyte by electrolysis in the anode compartment of the electrolytic cell, without cyanide compounds or oxidizing acids which need careful handling. The resulting dilute solution containing noble metals is treated in subsequent steps to separate noble metals or to increase the noble metal purity and concentration. The process of this invention shortens and simplifies the recovery steps, leading to economical operations.

We claim:

1. A process for dissolving noble metals from used catalysts which comprises treating used catalysts in particulte form containing at least one kind of platinum group metal or platinum group metal compound on a catalyst carrier or substrate in the anode compartment of an electrolytic cell, said cell containing an aqueous mineral acid electrolyte and having anode and cathode compartments separated by a diaphragm, by introducing an electric current into the electrolytic cell.

2. A process for dissolving noble metals as claimed in claim 1, wherein said used catalysts are those of used automotive exhaust gas catalytic converters.

3. A process for dissolving noble metals as claimed in claim 1 wherein said used catalysts are those used in fuel cell electrodes.

4. A process for dissolving noble metals as claimed in claim 1 wherein said platinum group metal compounds are metal compounds selected from the group consisting of platinum, palladium, rhodium and mixtures thereof.

5. A process for dissolving noble metals as claimed in claim 1 wherein the platinum group metals are selected from the group consisting of platinum, palladium, rhodium, and mixtures thereof.

6. A process for dissolving noble metals as claimed in any one of claim 1, claim 2, claim 3, claim 4 or claim 5 wherein the diaphragm is an ion exchange membrane.

7. A process for dissolving noble metals as claimed in claim 1, wherein said aqueous mineral acid electrolyte is hydrochloric acid.

8. A process for dissolving noble metals as claimed in claim 1, wherein the concentration of mineral acid in said aqueous electrolyte is from about 5 percent to about 35 percent by weight.

9. A process for dissolving noble metal as claimed in claim 1, wherein the anode compartment is larger than the cathode compartment in said electrolytic cell.

10. A process for recovering noble metals from used catalysts which comprises:
    (a) treating used catalysts in particulate form containing at least one kind of platinum group metal or platinum group metal compound on a catalyst carrier or substrate in the anode compartment of an electrolytic cell, said cell containing an aqueous mineral acid electrolyte and having anode and cathode compartments separated by a diaphragm, by introducing an electric current into the electrolytic cell; and
    (b) electrolyzing the electrolyte solution from step (a) containing platinum group metal components in a cathode compartment of an electrolytic cell having cathode particles in a fluidized state, wherein said noble metal components separate out on the cathode particles.

11. A process for recovering noble metals as claimed in claim 10, wherein said used catalysts containing at least one kind of platinum group metal or platinum group metal compound are those of used automotive exhaust gas catalytic converters.

12. A process for recovering noble metals as claimed in claim 10 wherein said catalyst carrier or substrate are those of non-conductive substances.

13. A process for recovering noble metals as claimed in claim 10, wherein the particles supporting or containing at least one kind of platinum group metal or platinum group metal compound are those of crushed fuel cell electrodes.

14. A process for recovering noble metals as claimed in claim 10, wherein the platinum group metal compounds are metal compounds selected from the group consisting of platinum, palladium, rhodium and mixtures thereof.

15. A process for recovering noble metals claimed in claim 10, wherein the platinum group metals are selected from the group consisting of platinum, palladium, rhodium and mixtures thereof.

16. A process for recovering noble metals as claimed in claim 14 or claim 15, wherein said used catalysts are those of used automotive exhaust gas catalytic converters.

17. A process for recovering noble metals as claimed in claim 10, wherein the electrolyte solution containing noble metal components in the cathode compartment is of suitable electrolyte concentration so that the noble metals separate out only on the cathode particles.

18. A process for recovering noble metals which comprises treating particles supporting or containing at least one kind of platinum group metal or platinum group metal compound in an aqueous mineral acid electrolyte in the anode compartment of an electrolytic cell which is divided by a diaphragm into anode and cathode compartments by introducing an electric current into the electrolytic cell; electrolyzing the electrolyte solution containing platinum group metal components in the cathode compartment of an electrolytic cell having cathode particles in a fluidized state, causing said platinum group metals to separate out on the cathode particles; and treating the cathode particles containing at least one kind of platinum group metal in an aqueous mineral acid electrolyte in the anode compartment of an electrolytic cell which cell is divided by a diaphragm into anode and cathode compartments, by introducing an electric current into the electrolytic cell.

19. A process for recovering noble metals as claimed in claim 18, wherein the electrolyte is hydrochloric acid.

20. A process for recovering noble metals as claimed in claim 18 or claim 19, wherein the particles which support or contain at least one kind of platinum group metal or platinum group metal compound are those of used catalysts.

21. A process for recovering noble metals as claimed in claim 20, wherein the used catalyst particles, support or contain a platinum group metal or platinum group metal compound selected from the group consisting of platinum, palladium, rhodium and mixtures thereof.

22. A process for recovering noble metals as claimed in claim 18 or 19 wherein the particles are those of crushed fuel cell electrodes supporting or containing at least one kind of platinum group metal or platinum group metal compound selected from the group consisting of platinum, palladium, rhodium and mixtures thereof.

* * * * *